United States Patent
Yang et al.

(10) Patent No.: US 12,008,658 B2
(45) Date of Patent: *Jun. 11, 2024

(54) DEEP LEARNING IMAGE PROCESSING METHOD FOR DETERMINING VEHICLE DAMAGE

(71) Applicant: STATE FARM MUTUAL AUTOMOBILE INSURANCE COMPANY, Bloomington, IL (US)

(72) Inventors: He Yang, The Colony, TX (US); Bradley A. Sliz, Normal, IL (US); Carlee A. Clymer, Atlanta, GA (US); Jennifer Malia Andrus, Champaign, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/110,510

(22) Filed: Feb. 16, 2023

(65) Prior Publication Data
US 2023/0222179 A1   Jul. 13, 2023

Related U.S. Application Data

(63) Continuation of application No. 16/937,318, filed on Jul. 23, 2020, now Pat. No. 11,610,074, which is a (Continued)

(51) Int. Cl.
*G06Q 40/08* (2012.01)
*G06F 16/583* (2019.01)
(Continued)

(52) U.S. Cl.
CPC .......... *G06Q 40/08* (2013.01); *G06F 16/583* (2019.01); *G06F 18/214* (2023.01); *G06F 18/22* (2023.01);
(Continued)

(58) Field of Classification Search
CPC . G06T 2207/20081; G06T 2207/20084; G06T 7/0004; G06T 2207/30156;
(Continued)

(56) References Cited

U.S. PATENT DOCUMENTS

| 6,347,313 | B1 | 2/2002 | Ma et al. |
| 9,660,869 | B2* | 5/2017 | Ripley ................. H04L 41/145 |

(Continued)

*Primary Examiner* — Kathleen Y Dulaney
(74) *Attorney, Agent, or Firm* — MARSHALL, GERSTEIN & BORUN LLP

(57) ABSTRACT

In a computer-implemented method and associated tangible non-transitory computer-readable medium, an image of a damaged vehicle may be analyzed to generate a repair estimate. A dataset populated with digital images of damaged vehicles and associated claim data may be used to train a deep learning neural network to learn damaged vehicle image characteristics that are predictive of claim data characteristics, and a predictive similarity model may be generated. Using the predictive similarity model, one or more similarity scores may be generated for a digital image of a newly damaged vehicle, indicating its similarity to one or more digital images of damaged vehicles with known damage level, repair time, and/or repair cost. A repair estimate may be generated for the newly damaged vehicle based on the claim data associated with images that are most similar to the image of the newly damaged vehicle.

20 Claims, 4 Drawing Sheets

Related U.S. Application Data continuation of application No. 16/023,414, filed on Jun. 29, 2018, now Pat. No. 10,762,385.

(60) Provisional application No. 62/526,879, filed on Jun. 29, 2017.

(51) Int. Cl.
*G06F 18/214* (2023.01)
*G06F 18/22* (2023.01)
*G06N 3/08* (2023.01)
*G06V 10/74* (2022.01)
*G06V 10/82* (2022.01)

(52) U.S. Cl.
CPC .............. *G06N 3/08* (2013.01); *G06V 10/761* (2022.01); *G06V 10/82* (2022.01); *G06V 2201/08* (2022.01)

(58) Field of Classification Search
CPC ... G06T 2207/30252; G06T 7/33; G06T 7/75; G06T 11/001; G06T 11/206; G06T 15/00; G06T 19/003; G06T 19/20; G06T 2200/24; G06T 2207/10004; G06T 2207/10016; G06T 2207/10024; G06T 2207/20024; G06T 2207/20076; G06T 2207/30136; G06T 2207/30248; G06T 2219/2008; G06T 7/0002; G06T 7/0008; G06T 7/001; G06T 7/11; G06T 7/143; G06T 7/194; G06T 7/32; G06T 7/344; G06T 7/40; G06T 9/002; G06Q 10/20; G06Q 40/08; G06Q 30/0283; G06Q 10/00; G06Q 10/06; G06Q 10/063; G06Q 10/06313; G06Q 10/06395; G06Q 10/067; G06Q 10/10; G06Q 30/016; G06Q 30/0278; G06Q 50/00; G06Q 50/01; G06N 3/08; G06N 3/045; G06N 7/01; G06N 20/00; G06N 20/20; G06N 5/01; G06N 20/10; G06N 3/063; G06N 3/084; G06N 3/088; G06N 5/046; G06N 7/08; G06F 18/23; G06F 16/5838; G06F 18/22; G06F 3/04842; G06F 16/29; G06F 16/3322; G06F 16/50; G06F 16/54; G06F 16/55; G06F 16/583; G06F 18/214; G06F 18/2155; G06F 18/2178; G06F 18/2323; G06F 18/241; G06F 18/24133; G06F 18/2431; G06F 18/28; G06F 2203/04802; G06F 3/0484; G06F 3/04845; G06F 7/36; G06V 10/82; G06V 2201/08; G06V 10/25; G06V 10/443; G06V 10/454; G06V 10/462; G06V 10/75; G06V 10/7635; G06V 10/764; G06V 10/7753; G06V 20/00; G06V 20/10; G06V 20/20; G06V 20/35; G06V 2201/09; G06V 30/194; G06V 30/274; G06V 10/761; G07C 5/006; G07C 5/008; G08B 19/00; G08B 23/00; G08B 25/016; G10L 15/26; H04L 41/145; H04L 41/147; H04L 41/22; H04W 4/02; H04W 4/21
USPC .................................................. 382/157, 104
See application file for complete search history.

(56) References Cited

U.S. PATENT DOCUMENTS

| | | | |
|---|---|---|---|
| 9,886,771 | B1* | 2/2018 | Chen .................. G06F 3/04845 |
| 10,319,094 | B1* | 6/2019 | Chen ........................ G06N 3/08 |
| 10,628,890 | B2 | 4/2020 | Dong et al. |
| 10,853,882 | B1 | 12/2020 | Leise et al. |
| 11,144,889 | B2 | 10/2021 | Li et al. |
| 2002/0035488 | A1 | 3/2002 | Aquila et al. |
| 2011/0172879 | A1* | 7/2011 | Abe ...................... G06Q 10/06 707/821 |
| 2016/0042253 | A1* | 2/2016 | Sawhney ............ G06F 18/2323 382/190 |
| 2017/0148102 | A1 | 5/2017 | Franke et al. |
| 2017/0221110 | A1* | 8/2017 | Sullivan ................. G06Q 10/20 |
| 2017/0293894 | A1* | 10/2017 | Taliwal .................. G06V 10/82 |
| 2018/0260793 | A1* | 9/2018 | Li .......................... G06Q 40/08 |
| 2018/0293806 | A1* | 10/2018 | Zhang .............. G06F 18/24133 |
| 2018/0300576 | A1* | 10/2018 | Dalyac ..................... G06N 7/08 |
| 2019/0065951 | A1 | 2/2019 | Luo et al. |
| 2021/0142464 | A1 | 5/2021 | Tian et al. |
| 2021/0256616 | A1* | 8/2021 | Hayward ............. G06V 30/274 |
| 2021/0272208 | A1* | 9/2021 | Leise .................... G06Q 40/08 |

\* cited by examiner

FIG. 4

DEEP LEARNING IMAGE PROCESSING METHOD FOR DETERMINING VEHICLE DAMAGE

CROSS REFERENCE TO RELATED APPLICATIONS

This application is a continuation of U.S. application Ser. No. 16/937,318, filed Jul. 23, 2020, and entitled "DEEP LEARNING IMAGE PROCESSING METHOD FOR DETERMINING VEHICLE DAMAGE;" which claims priority to and the benefit of: U.S. application Ser. No. 16/023,414, filed Jun. 29, 2018, and entitled "DEEP LEARNING IMAGE PROCESSING METHOD FOR DETERMINING VEHICLE DAMAGE;" which claims priority to and the benefit of: U.S. application Ser. No. 62/526,879, filed Jun. 29, 2017, and entitled "DEEP LEARNING IMAGE PROCESSING METHOD FOR DETERMINING VEHICLE DAMAGE;" the entire disclosures of each of which are hereby incorporated herein in their entirety.

FIELD OF THE DISCLOSURE

The present disclosure generally relates to technology for estimating damage level, repair time, and/or repair cost for a damaged vehicle.

BACKGROUND

An insured client whose vehicle has recently been damaged may wish to quickly obtain an initial estimate of the damage level, repair time, and/or repair cost for his or her damaged vehicle. Often, obtaining such an estimate may require that the insured client take the damaged vehicle to a repair shop. This may be difficult and time consuming for various reasons. For example, the extent of the damage to a vehicle may make it difficult for the client to transport the vehicle to the repair shop, or the nearest repair shop may be located far away. Even if a client is able to take his or her damaged vehicle to a repair shop, he or she may wish to see a second opinion to confirm the damage level, repair time, and/or repair cost for his or her damaged vehicle.

From past submitted insurance claims, insurance companies may have large databases containing images of damaged vehicles from a variety of perspectives, and associated claim data. In each instance, the claim data may include the damage level, repair time, and/or repair cost for the vehicles shown in the images. However, this rich source of information is generally not utilized once the insurance claims at issue are settled.

SUMMARY

The present embodiments disclose systems and methods that may relate to, inter alia, estimating damage level, repair time, and/or repair cost for a damaged vehicle by using deep learning image processing to compare a digital image of the damaged vehicle to one or more digital images of other damaged vehicles for which the damage level, repair time, and/or repair cost is known.

In one aspect, a computer-implemented method is provided that may include accessing a historical training dataset populated with digital images of damaged vehicles and historical claim data related to damaged vehicles and generating a predictive similarity model by using the historical training dataset to train a deep learning neural network. Training the deep learning neural network may include learning the damaged vehicle image characteristics that are predictive of one or more of damage level, repair time, or repair cost, as well as the degree to which each of the damaged vehicle image characteristics is predictive of one or more of damage level, repair time, or repair cost. The method as provided may further include determining, using the predictive similarity model, a similarity score for a given two digital images of damaged vehicles, and determining, based on the similarity score, that the given two digital images satisfy one or more similarity criteria. In response to determining that the two digital images satisfy the one or more similarity criteria, the method may further include displaying the two digital images on a single page and predicting the damage level, repair time, or repair cost for a first vehicle of the damaged vehicles based on the damage level, repair time, or repair cost for a second vehicle of the damaged vehicles.

In another aspect, a tangible, non-transitory computer-readable medium is provided that may store instructions that, when executed by one or more processors, cause the one or more processors to access a historical training dataset populated with digital images of damaged vehicles and historical claim data related to damaged vehicles and generate a predictive similarity model by using the historical training dataset to train a deep learning neural network. The instructions to train the deep learning neural network may include instructions that cause the one or more processors to learn the damaged vehicle image characteristics that are predictive of one or more of damage level, repair time, or repair cost, as well as the degree to which each of the damaged vehicle image characteristics is predictive of one or more of damage level, repair time, or repair cost. The tangible, non-transitory computer-readable medium as provided may further include instructions that cause the one or more processors to determine, using the predictive similarity model, a similarity score for a given two digital images of damaged vehicles, and determine, based on the similarity score, that the given two digital images satisfy one or more similarity criteria. In response to a determination that the two digital images satisfy the one or more similarity criteria, the instructions may further cause the one or more processors to display the two digital images on a single page and predict the damage level, repair time, or repair cost for a first vehicle of the damaged vehicles based on the damage level, repair time, or repair cost for a second vehicle of the damaged vehicles.

In another aspect, a computer system includes one or more processors and a memory storing instructions that, when executed by the one or more processors, cause the one or more processors to access a historical training dataset populated with digital images of damaged vehicles and historical claim data related to damaged vehicles. The instructions also cause the one or more processors to generate a predictive similarity model by using the historical training dataset to train a deep learning neural network. Training the deep learning neural network includes learning the damaged vehicle image characteristics that are predictive of one or more of damage level, repair time, or repair cost, and the degree to which each of the damaged vehicle image characteristics is predictive of one or more of damage level, repair time, or repair cost. The instructions also cause the one or more processors to determine, using the predictive similarity model, a similarity score for a given two digital images of damaged vehicles, determine, based on the similarity score, that the given two digital images satisfy one or more similarity criteria, and, in response to a determination that the two digital images satisfy the one or more similarity criteria, display the two digital images on a single page. The instructions also cause the one or more processors to predict the damage level, repair time, or repair cost for a first vehicle of the damaged vehicles based on the damage level, repair time, or repair cost for a second vehicle of the damaged vehicles.

BRIEF DESCRIPTION OF THE DRAWINGS

FIG. 4 depicts an exemplary set of user interfaces for uploading an image of a damaged vehicle, comparing the image to similar images of other damaged vehicles, and displaying a repair estimate for the damaged vehicle.

DETAILED DESCRIPTION

The embodiments described herein relate to, inter alia, systems and techniques for analyzing an image of a damaged vehicle to estimate a damage level, repair time, and/or repair cost for the damaged vehicle. An insured client, for instance, may take a digital photo of a damaged vehicle using a mobile device (e.g., a smartphone) and, using the systems and techniques described herein, obtain a repair estimate for the damage depicted in the digital image. The repair estimate may be based on the similarity of a damaged vehicle image to other damaged vehicle images for which a damage level, repair time, and/or repair cost are known. For example, the known damage level, repair time, and/or repair cost for similar images may be averaged or otherwise statistically analyzed to provide a repair estimate.

To obtain the damage and/or repair estimate, an image search engine may locate similar images by analyzing a database of images, and generating similarity scores for the damaged vehicle image and each of a number of other images in the database. The similarity scores may be generated according to a predictive similarity model. In particular, the predictive similarity model may be a set of rules indicating image characteristics predictive of damage level, repair time, and/or repair cost, and may be derived from a deep learning analysis of historical damaged vehicle images and associated insurance claim data. Two damaged vehicle images sharing several predictive image characteristics indicated by the predictive similarity model, for example, may yield a higher similarity score than two damaged vehicle images with fewer predictive image characteristics in common. The image search engine may select a number of images with the highest similarity scores to be used for the repair estimate.

In some embodiments, a user interface may be configured to allow a user to upload a photo of his or her damaged vehicle and view images of similar damaged vehicles as determined and selected or filtered by the image search engine. The user may have the option of selecting some of the vehicles to be averaged or otherwise statistically analyzed to provide a repair estimate, for example, and the repair estimate may then be displayed to the user.

Figure 1:
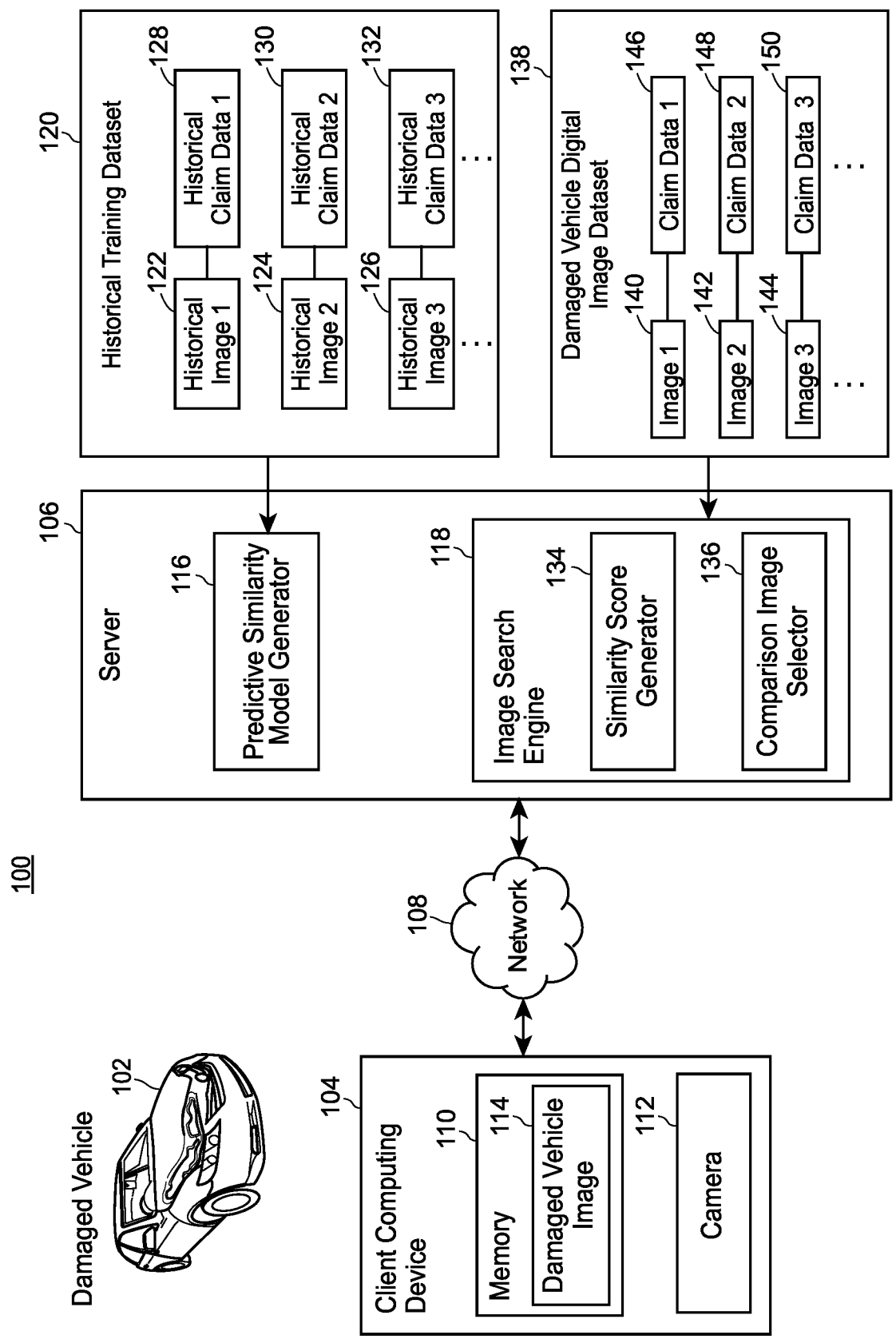
FIG. 1 depicts a system for estimating damage level, repair time, and/or repair cost for a damaged vehicle.

FIG. 1 depicts an exemplary system 100 for determining an estimated damage level, repair time, and/or repair cost for a damaged vehicle. The system 100 may include a damaged vehicle 102, a client computing device 104, a server 106, and a wired and/or wireless network 108. Although the damaged vehicle 102 is depicted as a car in FIG. 1, it will be understood that the damaged vehicle 102 may be any type of vehicle, such as, for example, a bus, truck, motorcycle, all-terrain vehicle, snowmobile, jet ski, golf cart, boat, or aircraft. The damaged vehicle 102 may be a recently damaged vehicle, for which a preliminary estimate of repair cost, repair time, and/or another, less quantitative indication of damage level (e.g., "heavy damage," etc.) is desired. The damaged vehicle 102 may be owned by an insured client (e.g., an individual customer, a rental car company, etc.).

The client computing device 104 may be any suitable device with a memory 110 and one or more processors (not shown in FIG. 1), such as a smartphone, a laptop computer, a desktop computer, a tablet, or a wearable device, for example. The memory 110 may be a computer-readable, non-transitory storage unit or device, or collection of units/devices, and may include persistent (e.g., hard disk) and/or non-persistent memory components. The memory 110 may store instructions that are executable on one or more processors of the client computing device 104 to perform various operations, including the instructions of various software applications and the data that is generated and/or used by such applications.

The client computing device 104 may also include a camera 112, which may be used to take a photograph producing a digital image 114 of the damaged vehicle 102. In some embodiments, the camera 112 may be separate from the client computing device 104, and may send the damaged vehicle image 114 to the client computing device 104 by a wired or wireless network (e.g., a Bluetooth network, a wireless local area network (WLAN), a cellular network, etc.). In one embodiment, for example, the camera 112 is integrated in a smartphone, while the client computing device 104 is a laptop or desktop computer that communicates with the smartphone via Bluetooth or a WLAN. Additionally, the client computing device 104 may send the damaged vehicle image 114 to the server 106 via the network 108.

The server 106 may include one or more processors (not shown in FIG. 1) and a memory (also not shown in FIG. 1). The memory may be a computer-readable, non-transitory storage unit or device, or collection of units/devices, and may include persistent (e.g., hard disk) and/or non-persistent memory components. The memory may store instructions that are executable on the one or more processors to perform various operations, including the instructions of various software applications and the data that is generated and/or used by such applications. The stored instructions may include instructions for executing a predictive similarity model generator 116 and an image search engine 118.

The predictive similarity model generator 116 may incorporate a deep learning neural network, or any other suitable kind of machine learning, to learn patterns in image characteristics from damaged vehicle images for which claim data is known. In particular, the predictive similarity model generator 116 may access a historical training dataset 120 to learn image characteristics that are predictive of various claim data characteristics (e.g., damage level, repair time, repair cost, or any other claim data characteristics relating to damage and/or repair). Based on the learned image characteristics, the predictive similarity model generator 116 may generate a predictive similarity model, which may include data and/or rules indicating which image characteristics are relevant for predicting damage and/or repair of a vehicle depicted in the image.

The historical training dataset 120 may include a set of historical images of damaged vehicles 122, 124, 126 and a set of historical claim data 128, 130, 132, from which the predictive similarity model generator 116 may be trained. Each of the historical images 122, 124, 126 may depict the damaged vehicles from a particular perspective, and may be associated with particular insurance claim data. In the example embodiment and scenario shown in FIG. 1, historical image 122 is associated with historical claim data 128, historical image 124 is associated with historical claim data 130, and historical image 126 is associated with claim data 132. Each of historical claim data 128, 130, 132 may include data (e.g., text, field values or codes, etc.) indicating information such as how a vehicle was damaged, where a vehicle was damaged, the qualitative severity of damage to a vehicle (e.g., "heavy," "moderate," etc.), the repair time for the damage to a vehicle, the repair cost for the damage to a vehicle, and/or any other information relevant to an insurance claim.

Although the depicted historical training dataset 120 includes three historical images 122, 124, 126 and three historical claim data 128, 130, 132, other embodiments and/or scenarios may include more or fewer images and more or fewer claim data (e.g., thousands of images and thousands of respective sets of claim data). Moreover, while FIG. 1 shows one historical image 122, 124, 126 associated with each of historical claim data 128, 130, 132, some embodiments may include a plurality of historical images associated with each of historical claim data 128, 130, 132. For example, historical image 122 may include multiple images of the same damaged vehicle, all associated with historical claim data 128. The multiple images may include a first image showing a car that suffered a front impact from a driver-side perspective (i.e., a profile view), and a second image showing the same car from a frontal perspective, for instance.

By processing the historical image 122 associated with historical claim data 128, the historical image 124 associated with claim data 130, the historical image 126 associated with historical claim data 132, and so forth, the predictive similarity model generator 116 may learn which image characteristics are indicative or predictive of which claim data characteristics (e.g., indicative or predictive of damage level, repair time, repair cost, and/or any other claim data characteristics relating to damage and/or repairs). For images that show a bent bumper portion of a vehicle, for example, the predictive similarity model generator 116 may determine that the depicted degree of bending within a particular area of the bumper is predictive of damage levels, repair times, and/or repair costs. The predictive similarity model generator 116 may also use information from the sets of historical claim data 128, 130, 132 to incorporate a greater level of specificity into the model. For example, the generated model may separately specify, for each of a number of different vehicle makes and models, the correlation between different ranges of bending in the bumper and different average repair times, costs, etc.

Furthermore, the predictive similarity model generator 116 may learn the degree to which each of the damaged vehicle image characteristics is indicative or predictive of certain claim data characteristics. For example, the predictive similarity model generator 116 may determine that a depicted degree of bending within a particular area of the bumper is highly predictive of repair time and/or repair cost. Bumpers bent beyond a certain angle may almost invariably require a replacement, for instance, or may even be highly predictive of frame or engine compartment damage. As another example, images that show scratching or marks on exterior portions of a bumper (or a vehicle generally) may be only slightly predictive of repair time and/or repair cost. Marks/scratches may be less predictive because it tends to be unclear, from an image alone, how deep a "scratch" may be and, therefore, whether the scratches or marks can easily be buffed out or instead require complete replacement (and/or some other more complex method of repair). Therefore, the costs associated with these image characteristics may be highly variable, and the image characteristics may only be predictive of a very wide range of potential costs and/or repair times.

Using the predictive similarity model, the image search engine 118 may locate one or more images with a high level of predictive similarity to the damaged vehicle image 114, to be used for a repair estimate or other damage level indicator. The image search engine 118 may include a similarity score generator 134 and a comparison image selector 136. The similarity score generator 134 may access the damaged vehicle image 114 and a damaged vehicle digital image dataset 138 that includes images for which repair data (and/or other claim data characteristics relating to damage level) is known. The similarity score generator 134 may then use the rules generated by the predictive similarity model generator 116 to generate a similarity score for each image in the damaged vehicle digital image dataset 138, with the score indicating the similarity between the image and the damaged vehicle image 114. Using the similarity scores, the comparison image selector 136 may select images from the dataset 138 to be compared with the damaged vehicle image 114 for the repair estimate or other damage level indicator.

The digital image dataset 138 may include a set of images 140, 142, 144 depicting damaged vehicles and a set of associated claim data 146, 148, 150. Each of the images 140, 142, 144 may depict a damaged vehicle from a particular perspective, and may be associated with particular insurance claim data. For example, as shown in FIG. 1, image 140 is associated with claim data 146, image 142 is associated with claim data 148, and image 144 is associated with claim data 150. Moreover, the claim data 146, 148, 150 may include information similar to that described above in connection with historical claim data 128, 130, 132.

Although as depicted in FIG. 1 the damaged vehicle digital image dataset 138 includes three images 140, 142, 144 and three claim data 146, 148, 150, other embodiments and/or scenarios may include any number of images and/or claim data. Additionally, although FIG. 1 shows one image 140, 142, 144 associated with each of claim data 146, 148, 150, some embodiments may include a plurality of images (e.g., showing different perspectives of a same damaged vehicle) associated with each of claim data 146, 148, 150. Moreover, while the damaged vehicle digital image dataset 138 is depicted in FIG. 1 as distinct from the historical training dataset 120, they may be the same dataset, or may include at least some of the same images and claim data, e.g., at least one of images 140, 142, 144 may be at least one of historical images 122, 124, 126, and at least one of claim data 146, 148, 150 may be at least one of historical claim data 128, 130, 132.

When comparing the images 140, 142, 144 with the damaged vehicle image 114, the similarity score generator 134 may use the rules, algorithm, and/or data of the predictive similarity model to detect which damaged vehicle image characteristics, previously identified as being predictive of claim data characteristics, are present in the damaged vehicle image 114. The similarity score generator 134 may then determine which image or images in damaged vehicle digital image dataset 138 share one, some, or all of the same characteristic(s). For each image in dataset 138 that shares at least one such characteristic, similarity score generator 134 may generate a similarity score. The score calculation may involve counting the number of common image characteristics, and/or applying any weighting of particular image characteristics as specified by the predictive similarity model, for example.

For example, if damaged vehicle image 114 has an image characteristic that is strongly predictive of a particular claim data characteristic, the similarity score generator 134 may tend to generate a higher similarity score for any images within dataset 138 that share that image characteristic. On the other hand, if damaged vehicle image 114 has an image characteristic that is only weakly predictive of a particular claim data characteristic, the similarity score generator 134 may tend to generate a lower similarity score for any images within dataset 138 that share that image characteristic. Of course, similarity scores may be lower still (e.g., zero) for images within dataset 138 that do not exhibit the image characteristic at all.

The similarity score generator 134 may generate a similarity score for the damaged vehicle image 114 and each of the images 140, 142, 144 in the damaged vehicle digital image dataset 138. That is, each similarity score may be associated with a particular image 140, 142, 144. It should be appreciated the similarity score generator 134 may generate more or fewer similarity scores based on the number of images 140, 142, 144 in the damaged vehicle digital image dataset 138, with each similarity score corresponding to an image in the damaged vehicle digital image dataset 138. Alternatively, the similarity score generator 134 may generate a similarity score only with respect to those images within dataset 138 that share at least one (predictive) image characteristic in common with damaged vehicle image 114.

The comparison image selector 136 may access the similarity scores to determine whether each of images 140, 142, 144 (or each of a subset of those images) falls above or below a similarity score threshold, or otherwise satisfies some suitable similarity criteria for use in a repair and/or damage level estimate. If a threshold is used, the comparison image selector 136 may use a similarity score threshold that is preset, or a similarity score threshold that is selected by a user. In some embodiments, the comparison image selector 136 may rank the similarity scores from highest to lowest in order to select a certain number of most similar images, where the number of images may be fixed (e.g., 20 images) or selected by a user.

The server 106 may send the images selected by the comparison image selector 136 to the client computing device 104 via the network 108. The client computing device 104 may then display the images on a user interface, such as the user interface 404 discussed below with respect to FIG. 4. In some embodiments, the client computing device 104, via the user interface, may prompt a user to select one or more of the displayed images that show damage that looks visually most similar to the damage to damaged vehicle 102. Based on the selection of the user, the client computing device 104 may display claim data corresponding to the selected image(s) (or other information derived therefrom, such as an average repair cost/time, etc.) via a user interface such as user interface 406 discussed below with respect to FIG. 4.

For instance, if the user selects image 140 as most visually similar, then some or all of claim data 146 corresponding to image 140 may be displayed via the user interface. If the user selects a plurality of images, the client computing device 104 may generate an average or other statistical analysis of the claim data corresponding to the selected images. In alternative embodiments, the client may not make any selection, and the client computing device 104 may generate and display an average or other statistical analysis of all claim data corresponding to images selected by the comparison image selector 136. In some embodiments, the client may select, via the user interface, various ways to group the images and claim data corresponding to similarity scores above the threshold. For instance, the client may choose to group the images and claim data by the particular make, model, and/or year of the vehicle depicted in the image. In this way, the client may determine an estimated damage level, repair cost, or repair time for the damaged vehicle 102.

Figure 2:
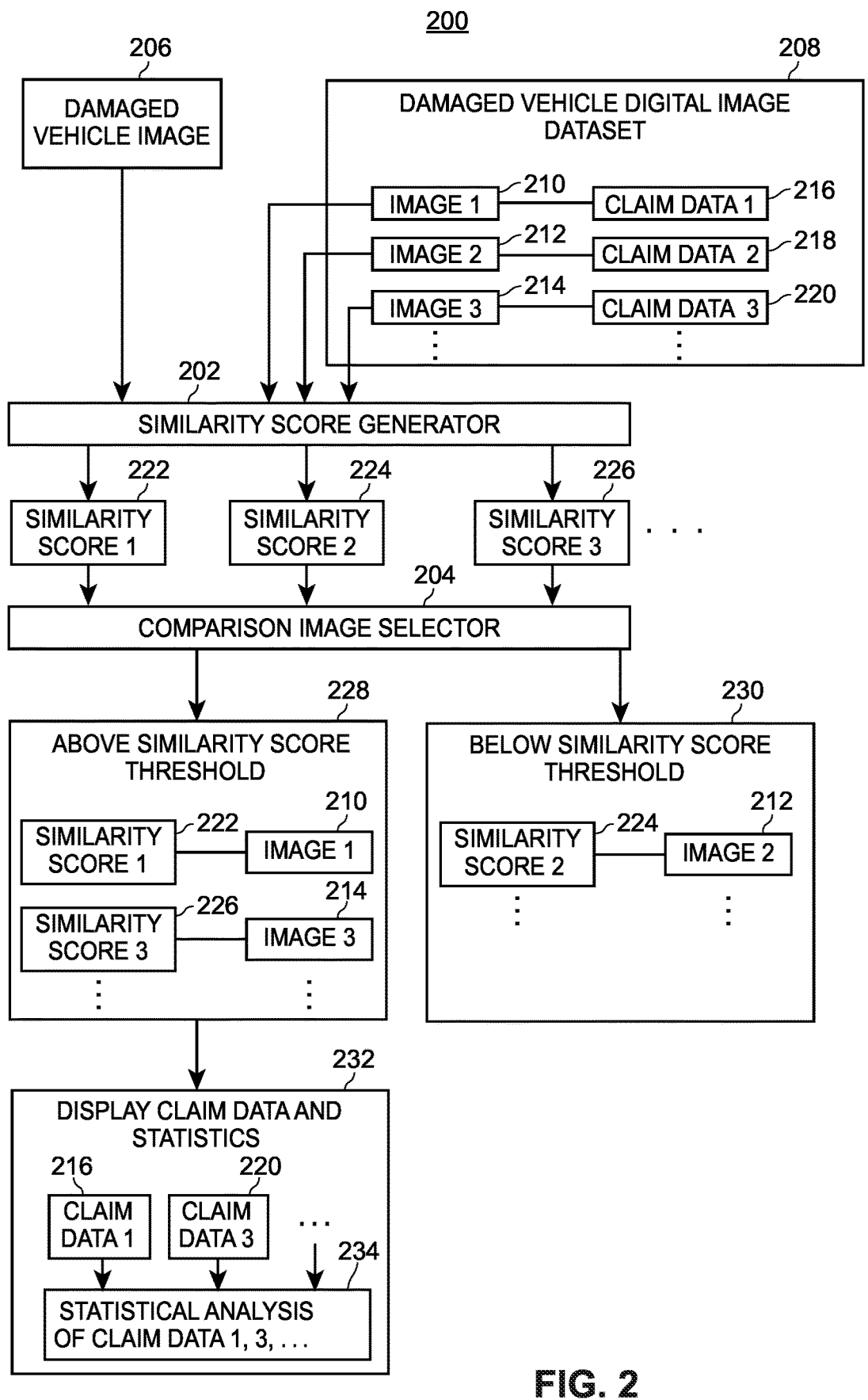
FIG. 2 is a data flow diagram depicting an exemplary image search engine for selecting and displaying images similar to an image of a damaged vehicle.

FIG. 2 is a data flow diagram depicting inputs, operations, and outputs of an exemplary image search engine 200 for selecting and displaying images similar to an image of a damaged vehicle. The image search engine 200 may be used as the image search engine 118 of FIG. 1, and includes a similarity score generator 202 and a comparison image selector 204 that may correspond to the similarity score generator 134 and comparison image selector 136, respectively, of FIG. 1. The image search engine 200 may access a damaged vehicle image 206 and a damaged vehicle digital image dataset 208 containing a number of images 210, 212, 214 and a number of corresponding claim data 216, 218, 220. In order to generate similarity scores indicating similarity levels between the damaged vehicle image 206 and each of the number of images 210, 212, 214, the similarity score generator 202 may analyze and process the damaged vehicle image 206 with each of the images 210, 212, 214. In various embodiments, each similarity score may be only a single score, or may be a set of scores reflecting the commonality of various different predictive image characteristics.

In the example embodiment shown in FIG. 2, for instance, similarity score 222 may correspond to the similarity between damaged vehicle image 206 and image 210, similarity score 224 may correspond to the similarity between damaged vehicle image 206 and image 212, and similarity score 226 may correspond to the similarity between damaged vehicle image 206 and image 214. Although three images 210, 212, 214 and three corresponding similarity scores 222, 224, 226 are depicted in FIG. 2, other embodiments may have any number of images with corresponding similarity scores.

Each similarity score may be based on predictive characteristics in common between both images, as discussed above with respect to FIG. 1. For example, if images of vehicles A and B each depict a shattered windshield, while images of vehicle C depict a dented bumper (or a windshield that has only been lightly scratched, etc.), the similarity score generator 202 may generate a higher score for vehicles A and B than for vehicles A and C. That is, although images of all three vehicles depict predictive image characteristics (e.g., image characteristics depicting vehicle damage such as a dented bumper and a shatter windshield), the similarity score generator 202 may generate a higher similarity score for images with the same predictive characteristics than for images with different predictive characteristics.

Additionally or alternatively, the similarity score may be based on the number of predictive characteristics present in both images. For example, a higher similarity score may be generated for two images that share four of the same predictive characteristics than for two images sharing only two of the same predictive characteristics. If images of vehicles D and E both depict a dented front bumper, a cracked headlight, a shattered windshield, and a detached side mirror, for instance, while images of vehicle F only depict a cracked headlight and a shattered windshield, the similarity score generator may generate a higher similarity score for vehicles D and E than for vehicles D and F. As a more specific example, the similarity score may generate an "8" on a 10-point scale for vehicles D and E, but only a "5" on a 10-point scale for vehicles D and F. Moreover, how strongly or weakly predictive each image characteristic is may also impact the similarity score for a given two images.

A comparison image selector 204 may then process the number of similarity scores 222, 224, 226 and output a set 228 of similarity scores above a similarity score threshold and a set 230 of similarity scores below the similarity score threshold. The threshold may be preset, or a user may input a threshold. In some embodiments, the comparison image selector 204 may rank the number of similarity scores 222, 224, 226 from highest to lowest in order to select a certain number of most similar images to be displayed in set 228. For instance, the comparison image selector 204 may select a fixed number of images (e.g., 20 images), or a number of images selected by a user.

As shown in FIG. 2, for example, similarity score 222 and similarity score 226 are both above the similarity score threshold. Their corresponding images 210 and 214 may be displayed to a user via a user interface, such as user interface 404 discussed below with respect to FIG. 4. Similarity score 224, on the other hand, is below the similarity score threshold, and therefore its corresponding image 212 may not be displayed.

Additionally or alternatively, a set 232 of claim data corresponding to the images selected by the comparison image selector may be displayed on a user interface, such as user interface 406, discussed below with respect to FIG. 4. For instance, claim data 216 corresponding to displayed image 210, claim data 220 corresponding to displayed image 214, and any other claim data corresponding with displayed images with similarity scores above the threshold, may be displayed. A statistical analysis 234 of the displayed claim data 216, 220, such as an average, median, mean, histogram, density plot, and/or any other type of numerical or graphical analysis, may further be displayed on the user interface. Moreover, the statistical analysis 234 may include an analysis of damage level, repair time, repair cost, and/or any other claim data parameter(s).

Figure 3:
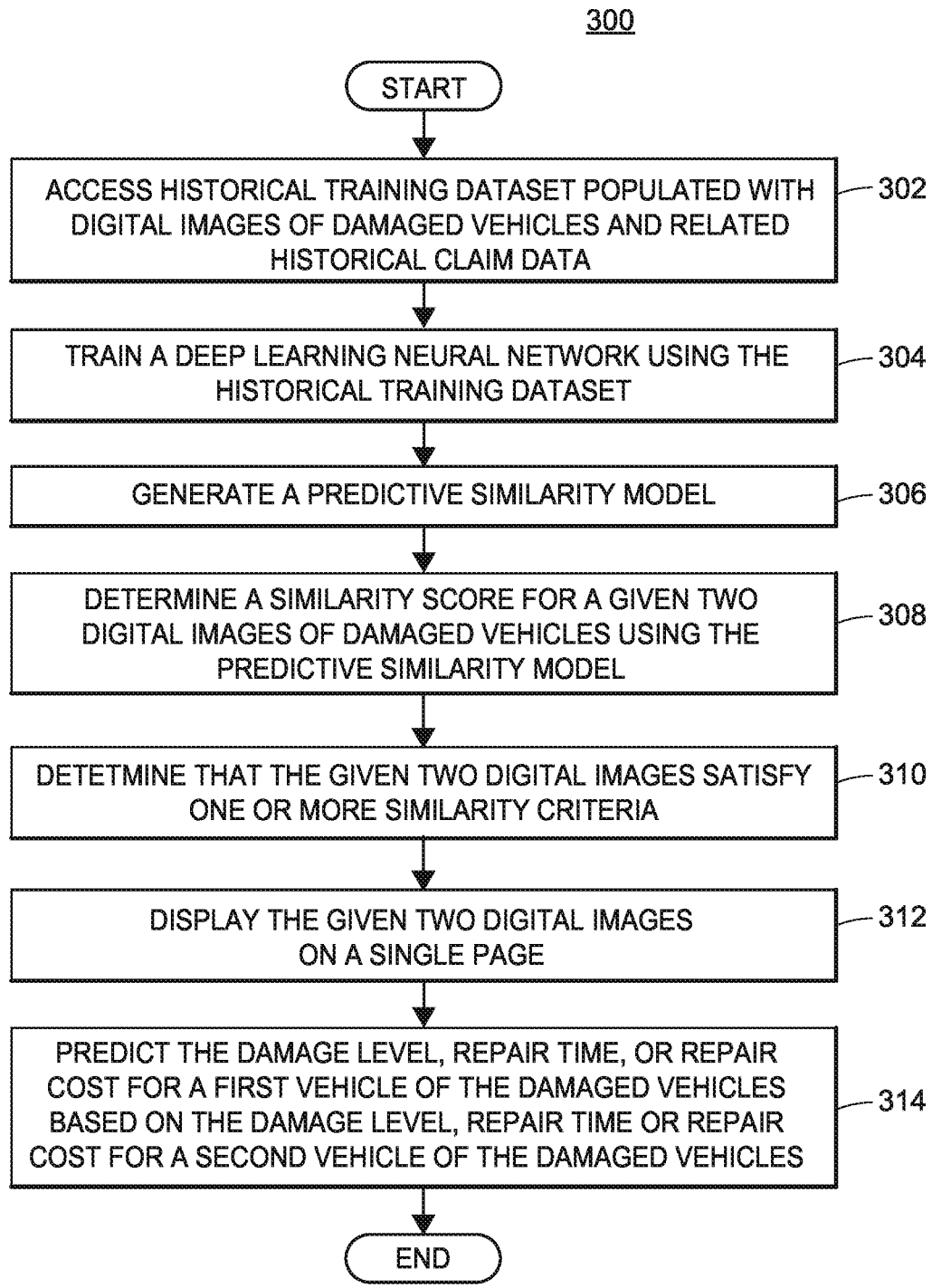
FIG. 3 is a flow diagram of an exemplary method for estimating the damage level, repair time, and/or repair cost for a damaged vehicle.

FIG. 3 is a flow diagram of an exemplary method 300 for estimating the damage level, repair time, and/or repair cost for a damaged vehicle. The method 300 may be implemented by one or more electronic devices, such as client computing device 104 and/or server 106 of FIG. 1, for example. The electronic device(s) may support execution of a dedicated application that may implement the functionalities of the method 300. The method 300 may be executed by a processor or processors of the electronic device(s), for example.

In the method 300, a historical training dataset populated with digital images of damaged vehicles and historical claim data related to the damaged vehicles may be accessed (block 302). The historical training dataset (e.g., historical training dataset 120 of FIG. 1) may include one or more images associated with each vehicle and/or claim data. Additionally, the images associated with a given vehicle may depict that vehicle from various different perspectives, and/or focus on various different parts of the vehicle. The historical claim data for a given vehicle may include data about the damage level of the vehicle, the repair time necessary to repair the damage to the vehicle, the cost of repairing the vehicle, the make, model, and/or year of the vehicle, the location of the damage on the vehicle, the cause of the damage, and/or any other data related to the damaged vehicle.

A deep learning neural network may be trained (block 304) using the historical training dataset. The deep learning neural network may process and analyze the historical images of damaged vehicles and associated historical claim data from the historical training dataset in order to learn which characteristics of the images are predictive of certain claim data characteristics, such as damage level, repair time, repair cost, etc. Additionally or alternatively, the predictive similarity model generator may be trained to learn the degree to which each of the damaged vehicle image characteristics is predictive of damage level, repair time, and/or repair cost (e.g., strongly or weakly predictive).

As a result of this training, a predictive similarity model may be generated (block 306). In particular, the predictive similarity model may include data and/or rules indicating which claim data characteristics are predictive, and/or the degree to which each characteristic is predictive, as indicated by the deep learning neural network processing of the historical images and historical claim data from the historical training dataset. Additionally or alternatively, the predictive similarity model may use a mathematical formula or algorithm to model how predictive each of the various image characteristics may be.

A similarity score for a given two images of damaged vehicles may be determined (block 308) using the predictive similarity model. The two images of damaged vehicles may include both a digital image of a newly damaged vehicle and a digital image from a dataset of damaged vehicles (e.g., the damaged vehicle digital image dataset 138). In some embodiments and/or scenarios, the dataset may be include a digital image of at least one damaged vehicle that is not depicted in the historical training dataset (i.e., the dataset of damaged vehicles may be different from the historical training dataset.) Moreover, the similarity score may be generated using a similarity score generator into which the predictive similarity model is incorporated (e.g., similarity score generator 134), and may be based on a weighting of the damaged vehicle image characteristics (i.e., the degree to which each characteristic is predictive of damage level, repair time, and/or repair cost).

In some embodiments and/or scenarios, block 308 includes determining a plurality of similarity scores, each corresponding to a digital image of a newly damaged vehicle and a respective one of a plurality of digital images. For example, each similarity score may correspond to the image of the newly damaged vehicle and a particular image in a dataset of other damaged vehicles.

It may be determined that the given two digital images satisfy one or more similarity criteria (block 310) based on the similarity score. The determination may include determining whether the similarity score exceeds a similarity score threshold, which may be pre-set or set by a user. In embodiments where a plurality of similarity scores is determined at block 308, the determination at block 310 may include finding one or more digital images from the dataset for which the corresponding similarity score is above the similarity score threshold using an image search engine (e.g., image search engine 118 of FIG. 1).

In response to the determination that the given two digital images satisfy the similarity criteria, the two digital images may be displayed (block 312), e.g., on a single page. The single page may be a user interface display, such as user interface 404 discussed below with respect to FIG. 4. In some embodiments, the digital images found using the image search engine may all be displayed on the single page. For example, if multiple images have similarity scores exceeding the similarity score threshold, the multiple images may all be displayed on the page. In some embodiments, the image search engine may cap the number of images displayed to a certain set of images associated with top similarity scores. For instance, in some embodiments, only images associated with the top ten similarity scores may be displayed. Additionally or alternatively, a client or user may have the option to select one or more of the most visually similar images from among the displayed images via the user interface.

The damage level, repair time, and/or repair cost for one of the vehicles depicted in one of the given two damaged vehicle images may be predicted (block 314) based on a known damage level, repair time, and/or repair cost for the other vehicle. In some embodiments, the damage characterization or prediction may be based on predictive statistics for the vehicle(s) depicted in the images found by the image search engine, e.g., for all vehicles with similarity scores exceeding a certain threshold. The damage characterization, prediction and/or predictive statistics may be displayed via a user interface such as user interface 406, discussed below with respect to FIG. 4. In particular, the predictive statistics may appear in graphical form, such as a histogram and/or density plot.

Figure 4:
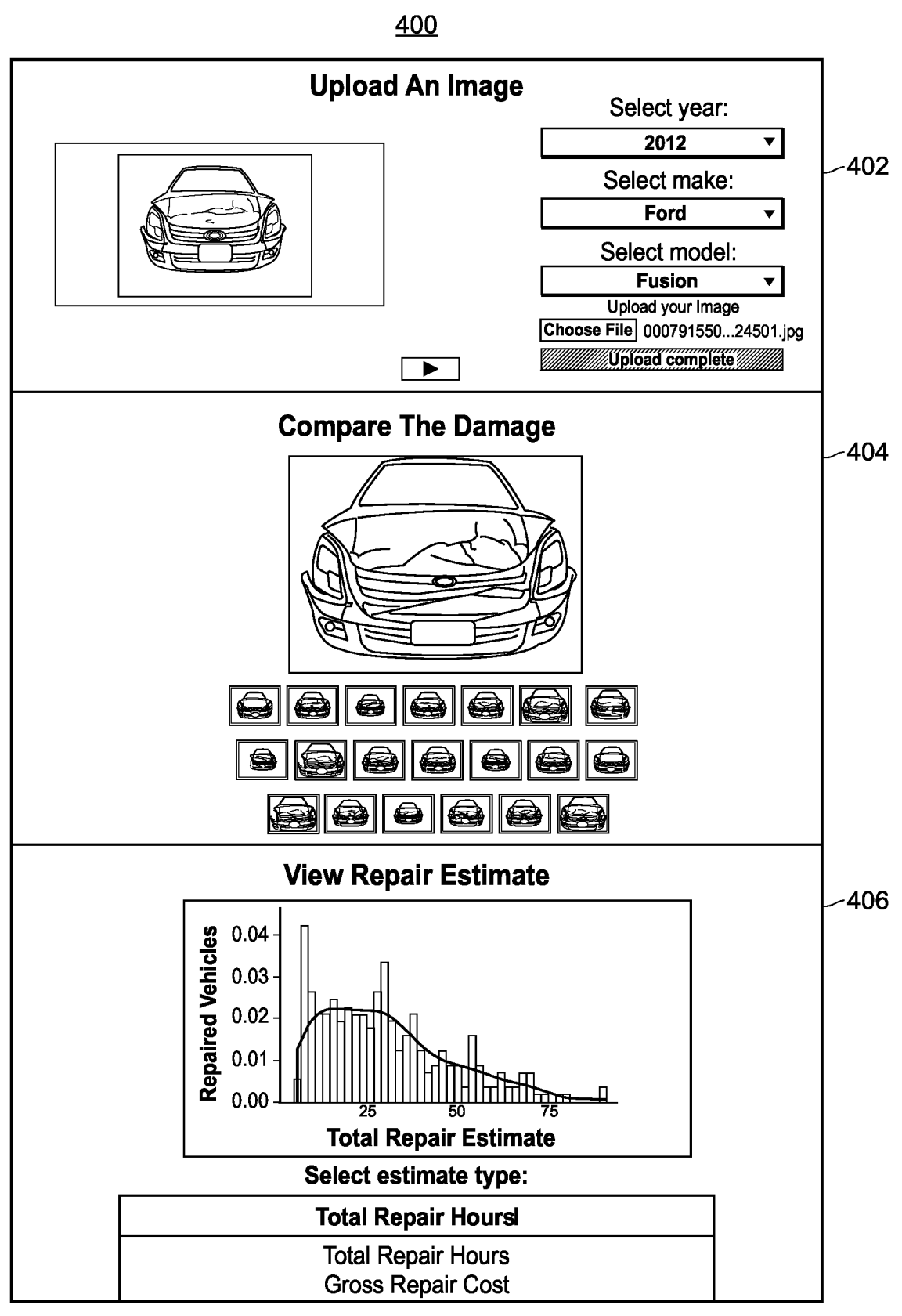

FIG. 4 depicts an exemplary set 400 of user interfaces 402, 404, and 406 for uploading an image of a damaged vehicle, comparing the image to similar images of other damaged vehicles, and displaying a repair estimate for the damaged vehicle, respectively. An electronic device, such as client computing device 104 of FIG. 1, may be configured to display the interface and/or receive selections and inputs via the user interfaces, where the electronic device may be associated with a client and/or user. For example, a dedicated application that is configured to operate on the electronic device may display the user interfaces. It should be appreciated that the user interfaces are merely examples and that alternative or additional content is possible.

The user interface 402 may enable a user to upload an image of a damaged vehicle, such as image 114 of FIG. 1 (e.g., taken using camera 112). In some embodiments, a user may upload multiple images of the damaged vehicle. The user interface 402 may be further configured to receive selections in drop-down menus for the year, make, and model of the vehicle in the image. In some embodiments, the user may select or input additional or alternative information, such as the location of damage, the cause of damage, or any other information related to the damage and/or the vehicle.

The user interface 404 may display the uploaded image alongside other damaged vehicle images for which repair data is known (e.g., images from the damaged vehicle digital image dataset 138 of FIG. 1, found using image search engine 118). In particular, interface 404 may be configured to receive user selections of one or more of the displayed damaged vehicles that are most similar to the uploaded damaged vehicle image with respect to the damage shown (and/or with respect to make, model, etc., if the displayed images are not already limited to such vehicles).

The user interface 406 may display a statistical analysis of the claim data associated with the selected and/or displayed images, such as a histogram and/or density plot. Additionally, the interface 406 may be configured to receive user selections of whether to view total repair hours and/or total repair cost, as shown in FIG. 4. In other embodiments, the user interface 406 may display more, fewer, and/or different types of information, such as a qualitative estimate of damage level (e.g., "heavy" or "totaled"), for example.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for automated correspondence management through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method, comprising:
determining, using a predictive similarity model, a similarity score for a given two digital images of damaged vehicles, wherein the predictive similarity model is trained using a historical training dataset populated with digital images of damaged vehicles and historical claim data related to the damaged vehicles, to identify damaged vehicle image characteristics that are predictive of one or more of damage level, repair time, or repair cost; and
based on the similarity score for the given two digital images,
predicting a damage level, repair time, or repair cost for a first damaged vehicle depicted in a first digital image of the given two digital images based on a known damage level, repair time, or repair cost for a second damaged vehicle depicted in a second digital image of the given two digital images.

2. The computer-implemented method of claim 1, wherein determining the similarity score for the given two digital images of damaged vehicles further comprises weighting the damaged vehicle image characteristics based on a degree to which each characteristic is predictive of at least one of damage level, repair time, or repair cost.

3. The computer-implemented method of claim 1, wherein determining the similarity score for the given two digital images of damaged vehicles includes:
determining a plurality of similarity scores each corresponding to a digital image of a newly damaged vehicle and a respective one of a plurality of digital images in a given dataset of damaged vehicles; and
the method further comprising finding, using an image search engine, a set of one or more digital images of damaged vehicles from the given dataset for which the similarity score is above a threshold similarity score.

4. The computer-implemented method of claim 3, wherein the given dataset of damaged vehicles is populated with digital images of at least one different damaged vehicle than the historical training dataset.

5. The computer-implemented method of claim 3, further comprising displaying the set of digital images found using the image search engine.

6. The computer-implemented method of claim 5, further comprising displaying one or more of a damage level, a repair time, or a repair cost associated with the one or more digital images of damaged vehicles found using the search engine.

7. The computer-implemented method of claim 3, further comprising:
generating predictive statistics for a damage level, repair time, or repair cost for the newly damaged vehicle based on a damage level, repair time, or repair cost for damaged vehicles depicted in the set of one or more digital images of damaged vehicles found using the image search engine; and
displaying the predictive statistics.

8. A tangible, non-transitory computer-readable medium storing instructions that, when executed by one or more processors, cause the one or more processors to:
determine, using a predictive similarity model, a similarity score for a given two digital images of damaged vehicles, wherein the predictive similarity model is trained using a historical training dataset populated with digital images of damaged vehicles and historical claim data related to the damaged vehicles, to identify damaged vehicle image characteristics that are predictive of one or more of damage level, repair time, or repair cost; and
based on the similarity score for the given two digital images,
predict a damage level, repair time, or repair cost for a first damaged vehicle depicted in a first digital image of the given two digital images based on a known damage level, repair time, or repair cost for a second damaged vehicle depicted in a second digital image of the given two digital images.

9. The tangible, non-transitory computer-readable medium of claim 8, wherein the instructions to determine the similarity score for the given two digital images of damaged vehicles further include instructions to weight the damaged vehicle image characteristics based on a degree to which each characteristic is predictive of at least one of damage level, repair time, or repair cost.

10. The tangible, non-transitory computer-readable medium of claim 8, wherein:
the instructions to determine the similarity score for the given two digital images of damaged vehicles further include instructions to determine a plurality of similarity scores each corresponding to a digital image of a newly damaged vehicle and a respective one of a plurality of digital images in a given dataset of damaged vehicles; and
wherein the instructions further cause the one or more processors to find, using an image search engine, a set of one or more digital images of damaged vehicles from the given dataset for which the similarity score is above a threshold similarity score.

11. The tangible, non-transitory computer-readable medium of claim 10, wherein the given dataset of damaged vehicles is populated with digital images of at least one different damaged vehicle than the historical training dataset.

12. The tangible, non-transitory computer-readable medium of claim 10, wherein the instructions further include instructions to display the set of digital images found using the image search engine.

13. The tangible, non-transitory computer-readable medium of claim 12, further including instructions to display one or more of a damage level, a repair time, or a repair cost associated with the one or more digital images of damaged vehicles found using the search engine.

14. The tangible, non-transitory computer-readable medium of claim 10, further including instructions to:
generate predictive statistics for a damage level, repair time, or repair cost for the newly damaged vehicle based on a damage level, repair time, or repair cost for damaged vehicles depicted in the set of one or more digital images of damaged vehicles found using the image search engine; and
display the predictive statistics.

15. A computer system comprising:
one or more processors; and
a memory storing instructions that, when executed by the one or more processors, cause the one or more processors to:
determine, using a predictive similarity model, a similarity score for a given two digital images of damaged vehicles, wherein the predictive similarity model is trained using a historical training dataset populated with digital images of damaged vehicles and historical claim data related to the damaged vehicles, to identify damaged vehicle image characteristics that are predictive of one or more of damage level, repair time, or repair cost; and based on the similarity score for the given two digital images,
predict a damage level, repair time, or repair cost for a first damaged vehicle depicted in a first digital image of the given two digital images based on a known damage level, repair time, or repair cost for a second damaged vehicle depicted in a second digital image of the given two digital images.

16. The computer system of claim 15, wherein the instructions to determine the similarity score for the given two digital images of damaged vehicles further include instructions to weight the damaged vehicle image characteristics based on a degree to which each characteristic is predictive of at least one of damage level, repair time, or repair cost.

17. The computer system of claim 15, wherein:
the instructions to determine the similarity score for the given two digital images of damaged vehicles further include instructions to determine a plurality of similarity scores each corresponding to a digital image of a newly damaged vehicle and a respective one of a plurality of digital images in a given dataset of damaged vehicles; and wherein the instructions further cause the one or more processors to find, using an image search engine, a set of one or more digital images of damaged vehicles from the given dataset for which the similarity score is above a threshold similarity score.

18. The computer system of claim 17, wherein the given dataset of damaged vehicles is populated with digital images of at least one different damaged vehicle than the historical training dataset.

19. The computer system of claim 17, wherein the instructions further include instructions to display the set of digital images found using the image search engine.

20. The computer system of claim 19, further including instructions to display one or more of a damage level, a repair time, or a repair cost associated with the one or more digital images of damaged vehicles found using the search engine.

* * * * *